Sept. 30, 1930.  W. J. BOTT  1,776,849
HORSE COLLAR
Filed Aug. 22, 1929
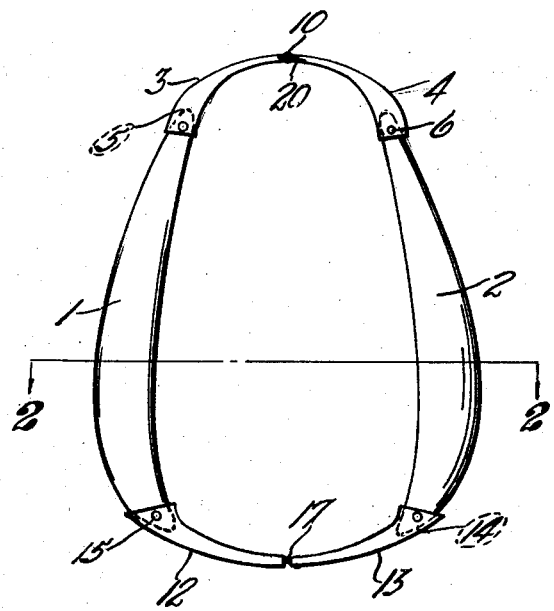
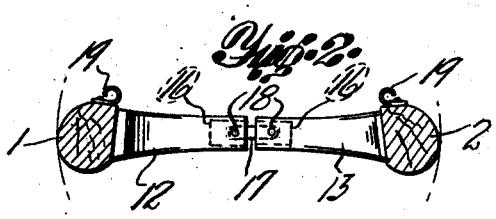
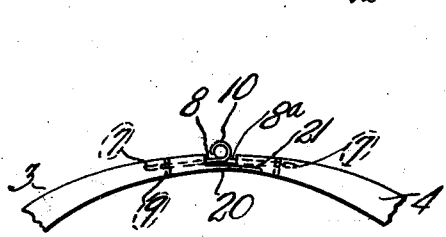 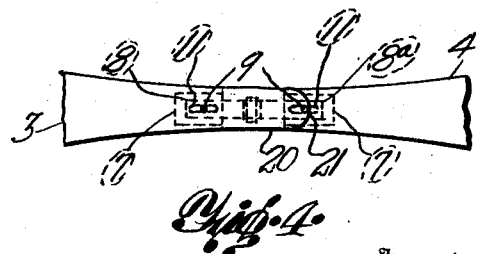
Inventor
William J. Bott.
By Adam E. Fisher.
Attorney Patented Sept. 30, 1930

1,776,849

UNITED STATES PATENT OFFICE

WILLIAM JAMES BOTT, OF SUNDERLAND, ONTARIO, CANADA

HORSE COLLAR

Application filed August 22, 1929. Serial No. 387,610.

This invention relates to a horse collar and the main object is to provide a simple, efficient and durable collar which will not injure the animal's neck and which will readily adjust itself to fit the neck and shoulder.

Another object is to provide a collar having its side draft members flexibly or hingedly connected so that they may sway or move with the movement of the animal's shoulders thereby allowing freer movement of its shoulders.

A further object is to provide a collar in which the side members may be cut away to prevent the collar from rubbing upon sore or chafed places upon the animal's neck or shoulder.

The foregoing and other objects together with means whereby the same may be carried into effect will best be understood from the following description of a preferred embodiment of the invention taken in connection with the accompanying drawing wherein:

Figure 1 is a front view of the improved collar;

Figure 2 is a section along the line 2—2 in Figure 1;

Figure 3 is an enlarged detail front view of the upper hinge; and

Figure 4 is an inverted plan view of the elements shown in Figure 3.

In carrying out the invention I provide the side members or pads 1 and 2 of the shape shown which are adapted to embrace the sides of the animal's neck in the usual manner. These side members 1 and 2 are preferably made of wood so that they may be cut or scraped away to clear any sore or chafed places upon the animal's neck or changed from full sweeney to half sweeney as will be understood. Upper connecting bars 3 and 4 are provided and the same have sockets 5 in their outer ends in which the upper ends of the said side members 1 and 2 may be secured by rivets 6. These top connecting bars are curved upwardly and inwardly as shown and terminate short of a meeting point, the inner ends of the bars 3 and 4 having elongated longitudinally extended hinge slots or sockets 7 in which hinge straps 8 and 8ª are loosely pivoted by pins 9, the said hinge straps being themselves hinged together by a hinge pin 10. These hinge straps 8 and 8ª are provided with longitudinal slots 11 for the reception of the pivot pins 9 thus allowing the upper end of the collar to be drawn apart when placing the collar upon the neck of the animal.

Lower connecting bars 12 and 13 are also provided and have sockets 14 in their outer ends in which the lower ends of the side members 1 and 2 may be inserted and secured in place by rivets 15.

These lower bars 12 and 13 curve downwardly and inwardly from the side members 1 and 2 and also terminate short of a meeting point. The inner ends of the bars 12 and 13 have elongated, longitudinally extended hinge slots or sockets 16 and a hinge strap 17 is loosely extended into these slots 16 and pivoted therein by pins 18. The side members 1 and 2 are provided with rolls 19 of any suitable material designed to prevent chafing the animal's neck and both the upper and lower connecting bars may also be provided with a similar protective means if so desired.

In use the collar is mounted on the animal's neck in the usual manner, the slots 11 on the hinge straps 8 and 8ª allowing the upper end to be made larger for this purpose as hereinbefore pointed out. This slotted construction of these hinge straps also allows the collar to adjust itself to fit the animal's neck, the sides 1 and 2 moving together or apart as necessary. The lower hinge strap 17 may also have slots for this purpose. It will be noted that the upper end of the collar is hinged in two directions by virtue of the hinged connection 10 of the hinge straps 8 and 8ª and their pivotal connection 9 with the upper connecting bars 3 and 4. The lower end of the collar is also hinged by the hinge strap 17 and the sides 1 and 2 together with their associated upper and lower connecting bars may thus swing forwardly or rearwardly to permit free movement of the animal's shoulders. The sides may also slightly move outwardly and inwardly to further carry out this effect. The upper connecting bar 3 has an extended lip 20 extending into a recess 21 cut in the adjacent connecting bar to prevent pinching or chafing of the animal's neck between the ends of the bars as they swing in time with the movements of the shoulders.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In a device of the character described, a pair of side members, upper connecting bars secured to the upper ends of the side members, the said upper connecting bars having hinge slots in their ends, hinge straps hingedly connected together and pivotally mounted in the said hinge slots, lower connecting bars secured to the lower ends of the side members, the said lower connecting bars having hinge slots in their ends, and a hinge strap extended into the said hinge slots and pivoted therein.

2. In a device of the character described, a pair of side members, upper connecting bars extended inwardly from the side members and having hinge slots in their ends, hinge straps pivoted together and having longitudinal slots adjacent their ends, the ends of the said hinge straps being loosely mounted in the said hinge slots, pivot pins in the said upper connecting bars engaging the said slots in the hinge straps, lower connecting bars extended inwardly from the side members and having hinge slots in their inner ends, and a hinge strap pivotally mounted in the said hinge slot in the lower connecting bars.

In testimony whereof I affix my signature.

WILLIAM JAMES BOTT.